United States Patent
Sugiura et al.

(10) Patent No.: US 10,971,720 B2
(45) Date of Patent: Apr. 6, 2021

(54) POSITIVE ELECTRODE ACTIVE MATERIAL, LITHIUM ION SECONDARY BATTERY, AND METHOD OF PRODUCING POSITIVE ELECTRODE ACTIVE MATERIAL

(71) Applicants: Toyota Jidosha Kabushiki Kaisha, Toyota (JP); Sumitomo Metal Mining Co., Ltd., Tokyo (JP)

(72) Inventors: Ryuta Sugiura, Toyohashi (JP); Satoshi Kanada, Niihama (JP); Tetsutaro Hayashi, Niihama (JP); Taira Aida, Niihama (JP)

(73) Assignees: Toyota Jidosha Kabushiki Kaisha, Toyota (JP); Sumitomo Metal Mining Co., Ltd., Tokyo (JP)

(*) Notice: Subject to any disclaimer, the term of this patent is extended or adjusted under 35 U.S.C. 154(b) by 169 days.

(21) Appl. No.: 15/953,947

(22) Filed: Apr. 16, 2018

(65) Prior Publication Data
US 2018/0316000 A1    Nov. 1, 2018

(30) Foreign Application Priority Data
Apr. 27, 2017  (JP) .............. JP2017-088476

(51) Int. Cl.
*H01M 4/36*    (2006.01)
*H01M 10/0525*    (2010.01)
(Continued)

(52) U.S. Cl.
CPC ........ *H01M 4/364* (2013.01); *C01G 45/1221* (2013.01); *C01G 51/42* (2013.01);
(Continued)

(58) Field of Classification Search
CPC ...... H01M 4/364; H01M 4/366; H01M 4/505; H01M 4/525; H01M 4/624;
(Continued)

(56) References Cited

U.S. PATENT DOCUMENTS

2008/0318131 A1* 12/2008 Watanabe .............. C01G 51/42
                                                              429/231.95
2013/0130103 A1*  5/2013 Kim .................. H01M 10/0525
                                                              429/211
(Continued)

FOREIGN PATENT DOCUMENTS

JP        2001-266879 A      9/2001
JP        2011-175906 A      9/2011
(Continued)

OTHER PUBLICATIONS

English translation of JP 2001-266879 relied on by the Examiner (Year: 2001).*
(Continued)

*Primary Examiner* — Christopher P Domone
*Assistant Examiner* — Kimberly Wyluda
(74) *Attorney, Agent, or Firm* — Dinsmore & Shohl LLP (57) ABSTRACT

A positive electrode active material includes secondary particles. The secondary particles include a plurality of primary particles. The primary particles include a lithium-containing composite metal oxide. Inside the secondary particles, an electron conducting oxide is disposed at at least a part of a grain boundary between the primary particles. The electron conducting oxide has a perovskite structure.

10 Claims, 5 Drawing Sheets

(51) Int. Cl.
*H01M 4/525* (2010.01)
*H01M 4/505* (2010.01)
*H01M 4/62* (2006.01)
*C01G 53/00* (2006.01)
*C01G 51/00* (2006.01)
*C01G 45/12* (2006.01)
*H01M 4/02* (2006.01)

(52) U.S. Cl.
CPC .............. *C01G 51/56* (2013.01); *C01G 51/70* (2013.01); *C01G 53/006* (2013.01); *C01G 53/50* (2013.01); *C01G 53/56* (2013.01); *C01G 53/66* (2013.01); *C01G 53/68* (2013.01); *C01G 53/70* (2013.01); *H01M 4/366* (2013.01); *H01M 4/505* (2013.01); *H01M 4/525* (2013.01); *H01M 4/624* (2013.01); *H01M 10/0525* (2013.01); *C01P 2002/34* (2013.01); *C01P 2004/84* (2013.01); *C01P 2006/40* (2013.01); *H01M 2004/028* (2013.01)

(58) Field of Classification Search
CPC ........ H01M 10/0525; H01M 2004/028; C01G 45/1221; C01G 51/42; C01G 51/56; C01G 51/70; C01G 53/006; C01G 53/50; C01G 53/56; C01G 53/66; C01G 53/68; C01G 53/70; C01P 2002/34; C01P 2004/84; C01P 2006/40

See application file for complete search history.

(56) References Cited

U.S. PATENT DOCUMENTS

2014/0356717 A1 12/2014 Gunji et al.
2017/0155134 A1 6/2017 Sugiura

FOREIGN PATENT DOCUMENTS

| JP | 2013-016422 A | 1/2013 |
| JP | 2013-131415 A | 7/2013 |
| JP | 2015-056363 A | 3/2015 |
| JP | 2017-103058 A | 6/2017 |

OTHER PUBLICATIONS

Shi, Ting et al., "Enhanced cycle stability at high rate and excellent high rate capability of $La_{0.7}Sr_{0.3}Mn_{0.7}Co_{0.3}O_3$-coated $LiMn_2O_4$", Journal of Power Sources 273, 2015, p. 959-965.

* cited by examiner

POSITIVE ELECTRODE ACTIVE MATERIAL, LITHIUM ION SECONDARY BATTERY, AND METHOD OF PRODUCING POSITIVE ELECTRODE ACTIVE MATERIAL

CROSS-REFERENCE TO RELATED APPLICATIONS

This application claims priority to Japanese Patent Application No. 2017-088476 filed on Apr. 27, 2017, which is incorporated herein by reference in its entirety including the specification, drawings and abstract.

BACKGROUND

1. Technical Field

The present disclosure relates to a positive electrode active material, a lithium ion secondary battery, and a method of producing a positive electrode active material.

2. Description of Related Art

Japanese Unexamined Patent Application Publication No. 2001-266879 (JP 2001-266879 A) discloses a positive electrode active material whose surface is covered with an electron conducting oxide having a perovskite structure.

SUMMARY

In general, a positive electrode active material of a lithium ion secondary battery is secondary particles in which a plurality of primary particles are aggregated. In JP 2001-266879 A, an electron conducting oxide is disposed on the surface of the secondary particles. In such a configuration, improvement in electron conductivity between secondary particles can be expected. However, there is room for improvement in electron conductivity between primary particles in primary particles constituting the inside of the secondary particles.

The present disclosure provides a positive electrode active material with reduced battery resistance, a lithium ion secondary battery using the same, and a method of producing a positive electrode active material.

The technical configuration and operations and effects of the present disclosure will be described below. However, the mechanism of action of the present disclosure includes assumptions. The scope of the claims should not be regarded as being limited according to the accuracy of the mechanism of action.

A first aspect of the present disclosure relates to a positive electrode active material. The positive electrode active material includes secondary particles. The secondary particles include a plurality of primary particles. The primary particles are a lithium-containing composite metal oxide. Inside the secondary particles, an electron conducting oxide is disposed at at least a part of a grain boundary between the primary particles. The electron conducting oxide has a perovskite structure and is represented by the following Formula (I):

[where, in the formula, A is at least one of La and Sr, M is at least one of Mn and Ni, and x1 and x2 satisfy $0<x1\leq1$, $0\leq x2\leq1$, $0.6\leq x1+x2\leq1$].

In the positive electrode active material, inside the secondary particles, an electron conducting oxide is disposed at a dense grain boundary between the primary particles. Therefore, improvement in electron conductivity between primary particles can be expected.

In addition, the electron conducting oxide having a perovskite structure (general formula: $ABO_3$) may contain Co (cobalt) at the B site. Thus, formation of an inactive phase can be limited at an interface between the electron conducting oxide and the primary particles. The inactive phase is assumed to be generated, for example, when the electron conducting oxide is generated, or when a battery is charged and discharged. The inactive phase is thought to have low electron conductivity. Thus, when formation of the inactive phase is limited, improvement in electron conductivity between primary particles can be expected. According to the synergistic effect of the above actions, reduction in battery resistance can be expected.

In Formula (I), x2 may satisfy $0.2\leq x2\leq0.95$. When the electron conducting oxide contains at least one of Mn (manganese) and Ni (nickel) at a specific proportion at the B sites, stabilization of a crystal structure can be expected. When the crystal structure is stabilized, release of oxygen radicals can be reduced. Thus, oxidative decomposition of an electrolytic solution is reduced, that is, prevention of gas generation can be expected. Therefore, both an effect of improving electron conductivity and an effect of reducing gas generation can be expected.

In Formula (I), A may be La.
In Formula (I), A may be Sr.
In Formula (I), A may be both La and Sr.
In Formula (I), M may be Mn.
In Formula (I), M may be Ni.
In Formula (I), M may be both Mn and Ni.

A second aspect of the present disclosure relates to a lithium ion secondary battery. The lithium ion secondary battery includes at least a positive electrode, a negative electrode, and an electrolytic solution. The positive electrode includes the positive electrode active material according to the first aspect. Therefore, reduction in battery resistance can be expected.

8) A third aspect of the present disclosure relates to a method of producing a positive electrode active material. The method of producing a positive electrode active material includes the following (α) to (δ), (α) preparing a precursor using a coprecipitation method,
(β) preparing a mixture by mixing the precursor and a lithium compound,
(γ) preparing a sintered product by heating the mixture; and
(δ) disintegrating the sintered product to produce a positive electrode active material. The precursor includes secondary particles, the secondary particles include a plurality of primary particles, and the primary particles are a composite metal hydroxide. When the mixture is heated, the primary particles become a lithium-containing composite metal oxide, and an electron conducting oxide is precipitated at at least a part of a grain boundary between the primary particles. The electron conducting oxide has a perovskite structure that is represented by the following Formula (I):

[where, in the formula, A is at least one of La and Sr, M is at least one of Mn and Ni, and x1 and x2 satisfy $0<x1\leq1$, $0\leq x2\leq1$, $0.6\leq x1+x2\leq1$].

In the production method, the precursor is prepared using a coprecipitation method. The mixture of the precursor and the lithium compound is sintered to produce a positive electrode active material. The primary particles grow due to sintering and the secondary particles are densified. In addition, the primary particles (composite metal hydroxide) become a lithium-containing composite metal oxide.

In the production method, the precursor is a precursor of the lithium-containing composite metal oxide and is a precursor of the electron conducting oxide. The electron conducting oxide is thought to be precipitated at a dense grain boundary that is formed when the primary particles grow during sintering.

Here, it is thought that, after the mixture of the precursor and the lithium compound is sintered (that is, after the secondary particles are densified), when the electron conducting oxide is added, the electron conducting oxide is not disposed at a grain boundary between the primary particles.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment (hereinafter referred to as the "present embodiment") of the present disclosure will be described below. However, the following description does not limit the scope of the claims.

In the drawings in this specification, for convenience of explanation, sizes are appropriately changed. Therefore, the sizes in the drawings do not reflect actual sizes. In this specification, for example, "at least one of A and B" includes "only A," "only B" and "both A and B."

<Positive Electrode Active Material>

Figure 1:
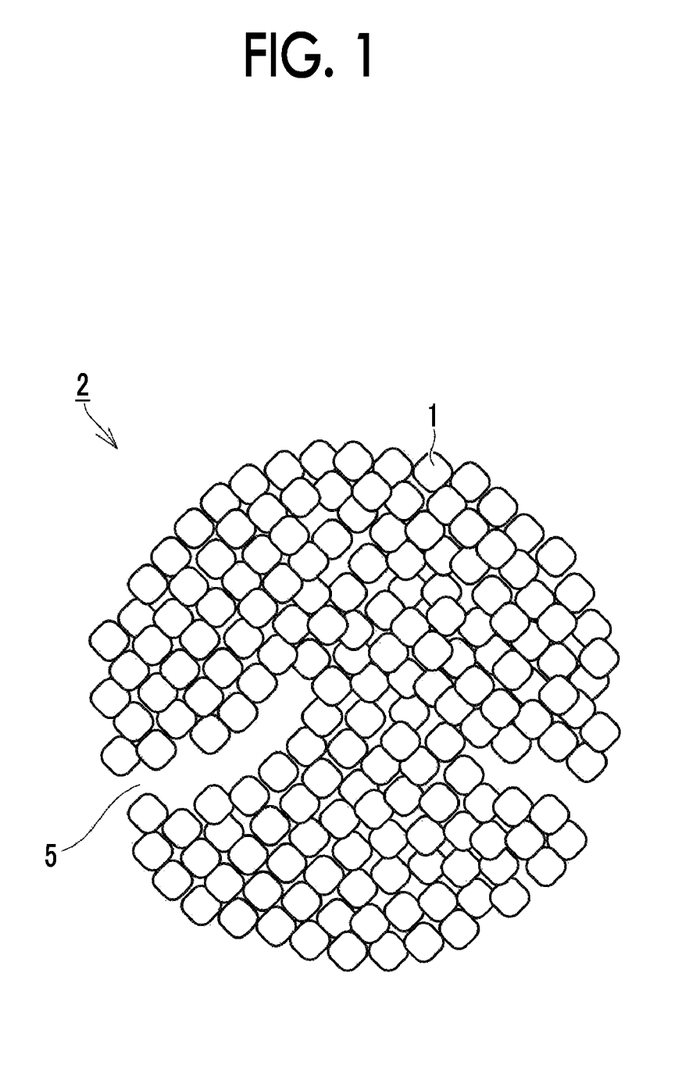
FIG. 1 is a conceptual sectional diagram for describing a positive electrode active material according to an embodiment of the present disclosure.

FIG. 1 is a conceptual sectional diagram for describing a positive electrode active material according to an embodiment of the present disclosure. The positive electrode active material includes a secondary particle 2. The secondary particle 2 includes a plurality of primary particles 1. The shape of the secondary particle 2 is not particularly limited. The secondary particle 2 may have, for example, a spherical shape or a clumped shape. The secondary particles 2 may have, for example, an average particle size of 3 μm to 30 μm (typically, 5 μm to 15 μm). The "average particle size" refers to a particle size of cumulative 50% from the side of fine particles in a volume-based particle size distribution measured by a laser diffraction scattering method. The secondary particles 2 may be porous. That is, the secondary particles 2 may have an open pore 5. The "open pore" indicates a pore that communicates with the outside of the secondary particle 2.

The primary particles 1 are a lithium-containing composite metal oxide. The lithium-containing composite metal oxide will be described below in detail. The primary particles 1 may have, for example, an average particle size of 10 nm to 3 μm. The shape of the primary particles 1 is not particularly limited. The primary particles 1 may have, for example, a spherical shape, a clumped shape, a columnar shape, or a plate shape.

Figure 2:
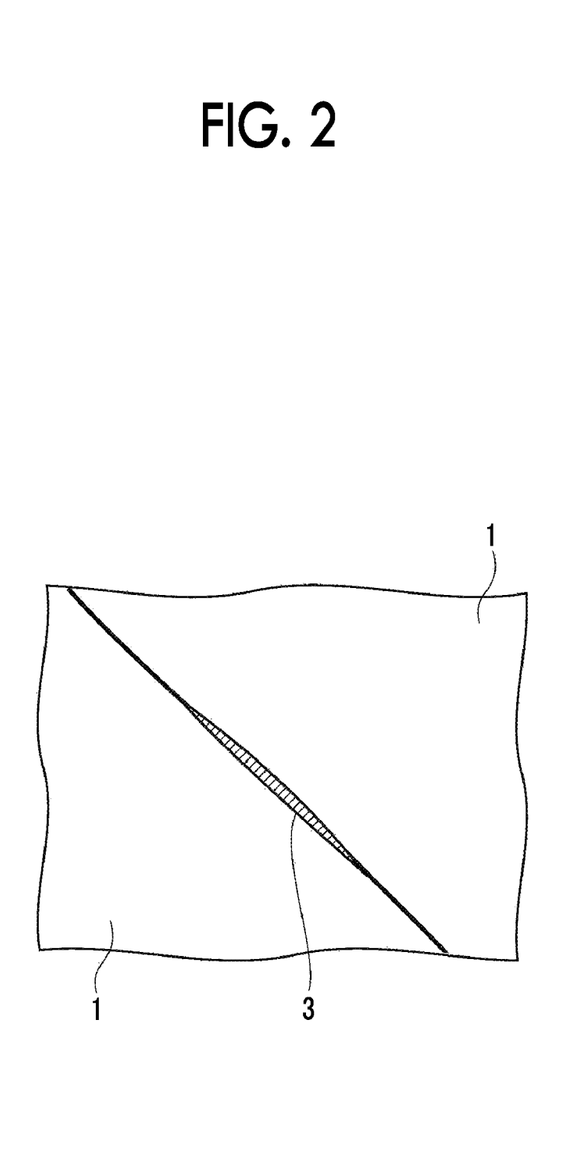
FIG. 2 is a conceptual sectional diagram for describing a grain boundary between primary particles in a secondary particle.

The secondary particles 2 are densified by sintering. That is, the primary particles 1 are densely packed. FIG. 2 is a conceptual sectional diagram for describing a grain boundary between the primary particles inside a secondary particle. An electron conducting oxide 3 is disposed at at least a part of a grain boundary between the primary particles 1. The "grain boundary" refers to a boundary between adjacent primary particles 1. The electron conducting oxide 3 may be disposed at a part of a grain boundary between the primary particles 1 or may be disposed at substantially the entire grain boundary between the primary particles 1. When the electron conducting oxide 3 is disposed at at least a part of a grain boundary between the primary particles 1, improvement in electron conductivity between the primary particles 1 can be expected.

The electron conducting oxide 3 may be combined with the primary particles 1. For example, a phase in which the electron conducting oxide 3 and the primary particles 1 are mutually solid-solutionized may be formed between the electron conducting oxide 3 and the primary particles 1. The form of the electron conducting oxide 3 is not particularly limited. The electron conducting oxide 3 may have a particle form or a film form.

The electron conducting oxide 3 may also be disposed on the surface of the secondary particles 2 as long as the electron conducting oxide 3 is disposed at a grain boundary between the primary particles 1. The electron conducting oxide 3 may also be disposed in the open pores 5 of the secondary particles 2. However, the electron conducting oxide 3 disposed on the surface of the secondary particles 2 and in the open pores 5 is thought to be unlikely to contribute to improvement in electron conductivity between the primary particles 1.

<Electron Conducting Oxide>

The electron conducting oxide 3 has a perovskite structure. The perovskite structure is represented by a general formula: $ABO_3$. In the formula, "A" indicates an element contained at the A site of the perovskite structure. In the formula, "B" indicates an element contained at the B site of the perovskite structure. In the electron conducting oxide 3 of the present embodiment, the A site contains at least one of La (lanthanum) and Sr (strontium). The B site contains Co. The B site may contain at least one of Mn and Ni.

That is, the electron conducting oxide 3 is represented by the following Formula (I):

$$ACo_{x1}M_{x2}O_3 \qquad (I)$$

[where, in the formula, A is at least one of La and Sr, M is at least one of Mn and Ni, and x1 and x2 satisfy $0 < x1 \le 1$, $0 \le x2 \le 1$, $0.6 \le x1 + x2 \le 1$].

In Formula (I), a composition proportion of La with respect to a sum of La and Sr may be 0 or more and 0.5 or less or 0.5 and more and 1 or less. In other words, a composition proportion of Sr with respect to a sum of La and Sr may be 0 or more and 0.5 or less or 0.5 and more and 1 or less.

In the electron conducting oxide 3, electrical neutrality may be obtained due to loss of some oxygen. That is, in Formula (I), a composition proportion of oxygen (O) may be smaller than 3. An amount of oxygen loss may be, for example, about 0 mol to 1 mol, with respect of 3 mol of oxygen.

In Formula (I), a composition proportion (x1+x2) of the B site is 0.6 or more and 1 or less. That is, in the electron conducting oxide 3, a part of the B sites may be lost. An amount of the B sites lost is 0 mol or more and 0.4 mol or less with respect to 1 mol. In addition, in the electron conducting oxide 3, a part of the A sites may be lost. That is, in Formula (I), a composition proportion of A may be smaller than 1. An amount of the A sites lost may be, for example, about 0 mol or more and 0.4 mol or less, with respect to 1 mol.

As shown in Formula (I), when the electron conducting oxide 3 contains Co at the B site, formation of an inactive phase at an interface between the electron conducting oxide 3 and the primary particles 1 may be prevented. The inactive phase is assumed to be generated, for example, when the electron conducting oxide 3 is generated or when the battery is charged and discharged. The inactive phase is thought to have low electron conductivity. Thus, when formation of the inactive phase is prevented, improvement in electron conductivity between the primary particles 1 can be expected.

In Formula (I), for example, a composition proportion (x1) of Co may satisfy $0.05 \leq x1 \leq 0.8$, may satisfy $0.1 \leq x1 \leq 0.8$, may satisfy $0.2 \leq x1 \leq 0.8$, may satisfy $0.2 \leq x1 \leq 0.5$, and may satisfy $0.5 \leq x1 \leq 0.8$.

The B site may contain at least one of Mn and Ni. When at least one of Mn and Ni is present at the B site, stabilization of a crystal structure can be expected. When the crystal structure is stabilized, release of oxygen radicals can be prevented. Thus, oxidative decomposition of an electrolytic solution is prevented, that is, prevention of gas generation can be expected.

In Formula (I), x2 may satisfy $0.2 \leq x2 \leq 0.95$. When a composition proportion (x2) of M (at least one of Mn and Ni) satisfies $0.2 \leq x2 \leq 0.95$, both an effect of improving electron conductivity and an effect of preventing gas generation can be expected. For example, x2 may satisfy $0.2 \leq x2 \leq 0.8$, may satisfy $0.2 \leq x2 \leq 0.7$, may satisfy $0.2 \leq x2 \leq 0.5$, x2 may satisfy $0.5 \leq x2 \leq 0.8$, or may satisfy $0.5 \leq x2 \leq 0.7$.

For example, the electron conducting oxide 3 may be at least one selected from the group consisting of $LaCoO_3$, $LaCo_{0.05}Mn_{0.95}O_3$, $LaCo_{0.2}Mn_{0.8}O_3$, $LaCo_{0.5}Mn_{0.5}O_3$, $LaCo_{0.8}Mn_{0.2}O_3$, $LaCo_{0.05}Ni_{0.95}O_3$, $LaCo_{0.2}Ni_{0.8}O_3$, $LaCo_{0.5}Ni_{0.5}O_3$, $LaCo_{0.8}Ni_{0.2}O_3$, $LaCo_{1/3}Ni_{1/3}Mn_{1/3}O_3$, $LaCo_{0.05}Mn_{0.6}Ni_{0.35}O_3$, $LaCo_{0.05}Mn_{0.35}Ni_{0.6}O_3$, $LaCo_{0.4}Ni_{0.3}Mn_{0.3}O_3$, $LaCo_{0.3}Ni_{0.4}Mn_{0.3}O_3$, $LaCo_{0.3}Ni_{0.3}Mn_{0.4}O_3$, $LaCo_{0.5}Mn_{0.3}Ni_{0.2}O_3$, $LaCo_{0.3}Mn_{0.5}Ni_{0.2}O_3$, $LaCo_{0.2}Mn_{0.5}Ni_{0.3}O_3$, $LaCo_{0.5}Mn_{0.2}Ni_{0.3}O_3$, $LaCo_{0.3}Mn_{0.5}Ni_{0.2}O_3$, $LaCo_{0.2}Mn_{0.3}Ni_{0.5}O_3$, $LaCo_{0.6}Mn_{0.2}Ni_{0.2}O_3$, and $LaCo_{0.2}Mn_{0.2}Ni_{0.6}O_3$.

For example, the electron conducting oxide 3 may be at least one selected from the group consisting of $SrCoO_3$, $SrCo_{0.05}Mn_{0.95}O_3$, $SrCo_{0.2}Mn_{0.8}O_3$, $SrCo_{0.5}Mn_{0.5}O_3$, $SrCo_{0.8}Mn_{0.2}O_3$, $SrCo_{0.05}Ni_{0.95}O_3$, $SrCo_{0.2}Ni_{0.8}O_3$, $SrCo_{0.5}Ni_{0.5}O_3$, $SrCo_{0.8}Ni_{0.2}O_3$, $SrCo_{1/3}Ni_{1/3}Mn_{1/3}O_3$, $SrCo_{0.05}Mn_{0.6}Ni_{0.35}O_3$, $SrCo_{0.05}Mn_{0.35}Ni_{0.6}O_3$, $SrCo_{0.4}Ni_{0.3}Mn_{0.3}O_3$, $SrCo_{0.3}Ni_{0.4}Mn_{0.3}O_3$, $SrCo_{0.3}Ni_{0.3}Mn_{0.4}O_3$, $SrCo_{0.5}Mn_{0.3}Ni_{0.2}O_3$, $SrCo_{0.3}Mn_{0.5}Ni_{0.2}O_3$, $SrCo_{0.2}Mn_{0.5}Ni_{0.3}O_3$, $SrCo_{0.5}Mn_{0.2}Ni_{0.3}O_3$, $SrCo_{0.3}Mn_{0.5}Ni_{0.2}O_3$, $SrCo_{0.2}Mn_{0.3}Ni_{0.5}O_3$, $SrCO_{0.6}Mn_{0.2}Ni_{0.2}O_3$, $SrCo_{0.2}Mn_{0.6}Ni_{0.2}O_3$, and $SrCo_{0.2}Mn_{0.2}Ni_{0.6}O_3$.

For example, the electron conducting oxide 3 may be at least one selected from the group consisting of $La_{0.5}Sr_{0.5}CoO_3$, $La_{0.5}Sr_{0.5}Co_{0.05}Mn_{0.95}O_3$, $La_{0.5}Sr_{0.5}Co_{0.2}Mn_{0.8}O_3$, $La_{0.5}Sr_{0.5}Co_{0.5}Mn_{0.5}O_3$, $La_{0.5}Sr_{0.5}Co_{0.8}Mn_{0.2}O_3$, $La_{0.5}Sr_{0.5}Co_{0.05}Ni_{0.95}O_3$, $La_{0.5}Sr_{0.5}Co_{0.2}Ni_{0.8}O_3$, $La_{0.5}Sr_{0.5}Co_{0.5}Ni_{0.5}O_3$, $La_{0.5}Sr_{0.5}Co_{0.8}Ni_{0.2}O_3$, $La_{0.5}Sr_{0.5}Co_{0.05}Mn_{0.6}Ni_{0.35}O_3$, $La_{0.5}Sr_{0.5}Co_{0.05}Mn_{0.35}Ni_{0.6}O_3$, $La_{0.5}Sr_{0.5}Co_{1/3}Ni_{1/3}Mn_{1/3}O_3$, $La_{0.5}Sr_{0.5}Co_{0.4}Ni_{0.3}Mn_{0.3}O_3$, $La_{0.5}Sr_{0.5}Co_{0.3}Ni_{0.4}Mn_{0.3}O_3$, $La_{0.5}Sr_{0.5}Co_{0.3}Ni_{0.3}Mn_{0.4}O_3$, $La_{0.5}Sr_{0.5}Co_{0.5}Mn_{0.3}Ni_{0.2}O_3$, $La_{0.5}Sr_{0.5}Co_{0.3}Mn_{0.5}Ni_{0.2}O_3$, $La_{0.5}Sr_{0.5}Co_{0.2}Mn_{0.5}Ni_{0.3}O_3$, $La_{0.5}Sr_{0.5}Co_{0.5}Mn_{0.2}Ni_{0.3}O_3$, $La_{0.5}Sr_{0.5}Co_{0.3}Mn_{0.5}Ni_{0.2}O_3$, $La_{0.5}Sr_{0.3}Co_{0.2}Mn_{0.3}Ni_{0.5}O_3$, $La_{0.5}Sr_{0.5}Co_{0.6}Mn_{0.2}Ni_{0.2}O_3$, $La_{0.5}Sr_{0.5}Co_{0.2}Mn_{0.6}Ni_{0.2}O_3$, and $La_{0.5}Sr_{0.5}Co_{0.2}Mn_{0.2}Ni_{0.6}O_3$.

For example, the electron conducting oxide 3 may be at least one selected from the group consisting of $LaCoO_3$, $LaCo_{0.05}Mn_{0.95}O_3$, $LaCo_{0.2}Mn_{0.8}O_3$, $LaCo_{0.5}Mn_{0.5}O_3$, $LaCo_{0.8}Mn_{0.2}O_3$, $LaCo_{0.2}Ni_{0.8}O_3$, $LaCo_{0.5}Ni_{0.5}O_3$, $LaCo_{0.8}Ni_{0.2}O_3$, $LaCo_{0.4}Ni_{0.3}Mn_{0.3}O_3$, $LaCo_{0.2}Ni_{0.04}Mn_{0.4}O_3$, $SrCo_{0.5}Ni_{0.5}O_3$, $La_{0.5}Sr_{0.5}Co_{0.5}Ni_{0.5}O_3$, and $La_{0.7}Co_{0.1}Mn_{0.4}Ni_{0.3}O_{2.55}$.

The crystal structure of the electron conducting oxide 3 may be determined by an X-ray diffraction (XRD) method or an electron beam diffraction method. The composition of the electron conducting oxide 3 may be measured by an energy dispersive X-ray spectroscopy analysis (EDX) method or the like. For example, first, the positive electrode active material (the secondary particle 2) is embedded in a predetermined resin. According to focused ion beam (FIB) processing, a cross section sample of the secondary particle 2 is prepared. According to a scanning transmission electron microscope (STEM)-EDX device, the cross section sample is analyzed. A scanning electron microscope (SEM)-EDX device may be used.

In the cross section sample, a location of the electron conducting oxide 3 is checked. According to an electron diffraction pattern of the electron conducting oxide 3, the crystal structure may be determined. According to EDX analysis (spot analysis) of the electron conducting oxide 3, the composition of the electron conducting oxide 3 may be measured. The composition may be determined by calculating an arithmetic mean of measurement results of at least 3 locations.

For example, a proportion of the electron conducting oxide 3 with respect to the amount of the lithium-containing composite metal oxide may be 0.01 mol % or more and 10 mol % or less, 0.1 mol % or more and 5 mol % or less, or 0.5 mol % or more and 1 mol % or less.

<Lithium-Containing Composite Metal Oxide>

The primary particles 1 are a lithium-containing composite metal oxide. The "lithium-containing composite metal oxide" refers to a composite oxide containing lithium (Li) and other metal elements. The lithium-containing composite metal oxide may have various crystal structures. The lithium-containing composite metal oxide may have, for example, a layered rock salt structure, a spinel structure, or an olivine structure.

For example, the lithium-containing composite metal oxide may be at least one selected from the group consisting of $LiCoO_2$, $LiCo_{0.2}Mn_{0.8}O_2$, $LiCo_{0.5}Mn_{0.5}O_2$, $LiCo_{0.8}Mn_{0.2}O_2$, $LiNi_{0.8}Co_{0.2}O_2$, $LiNi_{0.5}Co_{0.5}O_2$, $LiNi_{0.2}Co_{0.8}O_2$, $LiNi_{1/3}Co_{1/3}Mn_{1/3}O_2$, $LiNi_{0.3}Co_{0.4}Mn_{0.3}O_2$, $LiNi_{0.4}Co_{0.3}Mn_{0.3}O_2$, $LiNi_{0.3}Co_{0.3}Mn_{0.4}O_2$, $LiNi_{0.2}Co_{0.8}Mn_{0.3}O_2$, $LiNi_{0.2}Co_{0.3}Mn_{0.5}O_2$, $LiNi_{0.3}Co_{0.2}Mn_{0.5}O_2$, $LiNi_{0.3}Co_{0.5}Mn_{0.2}O_2$, $LiNi_{0.2}Co_{0.3}Mn_{0.5}O_2$, $LiNi_{0.5}Co_{0.2}Mn_{0.3}O_2$, $LiNi_{0.2}Co_{0.6}Mn_{0.2}O_2$, $LiNi_{0.2}Co_{0.2}Mn_{0.6}O_2$, and $LiNi_{0.6}Co_{0.2}Mn_{0.2}O_2$.

<Method of Producing Positive Electrode Active Material>

Figure 3:
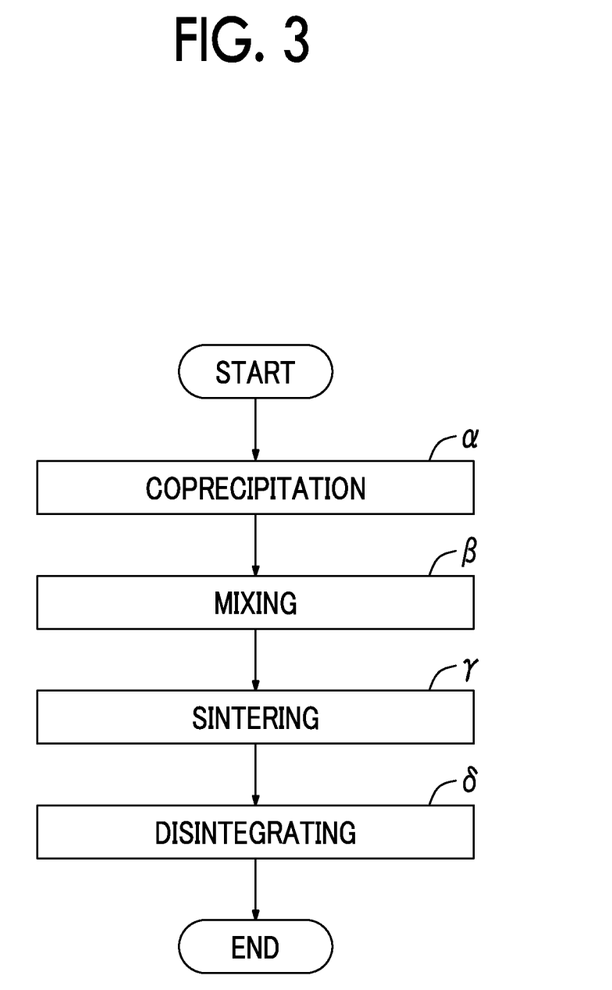
FIG. 3 is a flowchart showing an overview of a method of producing a positive electrode active material according to an embodiment of the present disclosure.

The positive electrode active material may be produced by the following production method. FIG. 3 is a flowchart showing an overview of a method of producing a positive electrode active material according to an embodiment of the present disclosure. The production method of the present embodiment includes "(α) coprecipitation," "(β) mixing," "(γ) sintering" and "(δ) disintegrating." The production method of the present embodiment will be described below in that order.

<(α) Coprecipitation>

The production method of the present embodiment includes preparation of a precursor using a coprecipitation method. The "coprecipitation method" is a powder synthesis method using a coprecipitation phenomenon. First, an aqueous alkali solution with a predetermined pH is prepared. For example, the aqueous alkali solution may be prepared by mixing water, an aqueous sodium hydroxide (NaOH) solution, and ammonia water at a predetermined mixing ratio. The aqueous alkali solution may be prepared to have, for example, a pH of 11 to 14.

A raw material aqueous solution is prepared. The raw material aqueous solution contains metal ions included in the lithium-containing composite metal oxide and the electron conducting oxide. For example, the raw material aqueous solution may be prepared by dissolving a Co sulfate, a La sulfate, or and like in water.

The aqueous alkali solution and the raw material aqueous solution are mixed in a reaction tank. A temperature in the reaction tank may be adjusted to, for example, 20° C. to 60° C. A NaOH aqueous solution and ammonia water may be added to the mixed aqueous solution at a suitable time so that a pH of 11 to 14 is maintained. Thereby, a precipitate (coprecipitation product) is obtained. The precipitate is a composite metal hydroxide.

In the present embodiment, the composite metal hydroxide contains (i) at least one of La and Sr; and Co; or (ii) at least one of La and Sr; Co; and at least one of Mn and Ni.

The composite metal hydroxide is a precursor of the lithium-containing composite metal oxide and is a precursor of the electron conducting oxide. The composite metal hydroxides (primary particles) are thought to precipitate while aggregating. That is, the precursor includes secondary particles. The secondary particles include a plurality of primary particles. The primary particles are a composite metal hydroxide.

<(β) Mixing>

The production method of the present embodiment includes preparation of a mixture by mixing the precursor and a lithium compound. The precursor (composite metal hydroxide) obtained above is washed with water and dried. A drying temperature may be, for example, about 50° C. to 120° C. Next, for example, the precursor and the lithium compound are mixed by a ball mill or the like. The lithium compound may be, for example, lithium carbonate ($Li_2CO_3$) or lithium hydroxide (LiOH). For example, the precursor and the lithium compound may be mixed at a molar ratio of "Li:Me=0.8:1 to 1.2:1." "Me" indicates a sum of metal elements (Co, Mn, Ni) other than La and Sr.

<(γ) Sintering>

The production method of the present embodiment includes preparation of a sintered product by heating the mixture. The mixture may be heated using, for example, an electric furnace. The mixture may be heated in, for example, an oxygen atmosphere. The heating may be performed in one step or in multiple steps. In the case of multiple steps, a heating temperature may gradually increase. The heating temperature may be, for example, 500° C. to 1100° C. or 700° C. to 1100° C. A heating time may be, for example, about 5 to 20 hours.

It is thought that Li diffuses into a solid due to heating. Thus, the lithium-containing composite metal oxide (for example, $LiNi_{1/3}Co_{1/3}Mn_{1/3}O_2$) is thought to be generated from the composite metal hydroxide. That is, the primary particles become a lithium-containing composite metal oxide. When the primary particles grow, the secondary particles are densified. Further, the electron conducting oxide is thought to precipitate at at least a part of a grain boundary between the primary particles. The electron conducting oxide has a perovskite structure and is represented by Formula (I).

<(δ) Disintegrating>

The production method of the present embodiment includes disintegration of the sintered product to produce a positive electrode active material. The sintered product is cooled and then disintegrated. The sintered product may be disintegrated using, for example, a ball mill or a jet mill. The positive electrode active material (secondary particles) may be disintegrated so that it has an average particle size of, for example, 3 μm to 30 μm. Accordingly, the positive electrode active material of the present embodiment may be produced.

<Lithium Ion Secondary Battery>

A lithium ion secondary battery including a positive electrode active material of the present embodiment will be described below. In the following description, the lithium ion secondary battery will be abbreviated as a "battery" in some cases.

Figure 4:
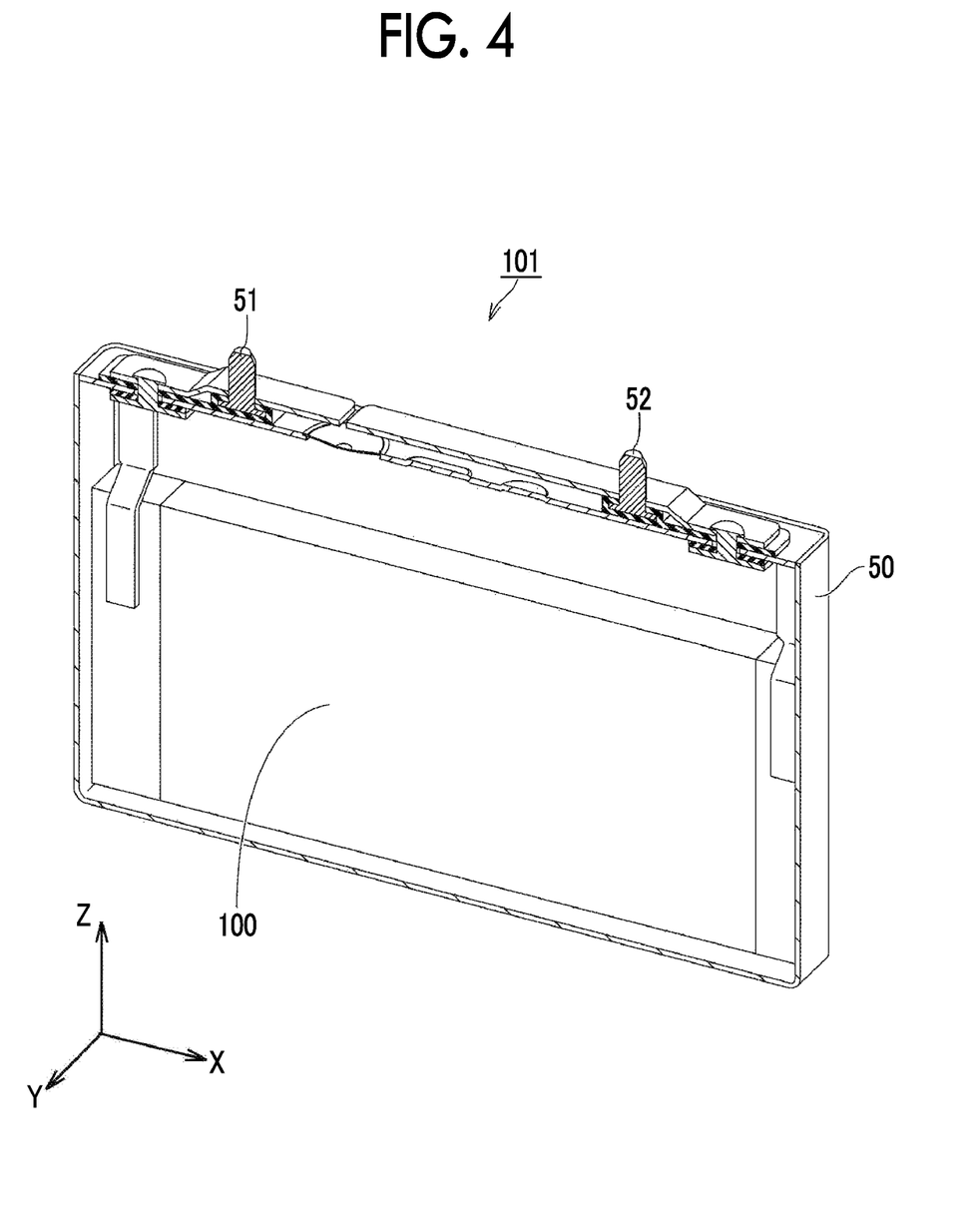
FIG. 4 is a schematic diagram showing an example of a configuration of a lithium ion secondary battery according to an embodiment of the present disclosure.

FIG. 4 is a schematic diagram showing an example of a configuration of a lithium ion secondary battery according to an embodiment of the present disclosure. A battery 101 may have a rectangular shape (flat rectangular parallelepiped). The battery 101 may have a cylindrical shape. The battery 101 includes a housing 50. The housing 50 is made of, for example, an aluminum (Al) alloy. The housing 50 may be, for example, a bag made of an aluminum laminate film. The housing 50 may include a current interruption mechanism (CID), a gas discharge valve, an injection hole, and the like.

The housing 50 is hermetically sealed. An electrode group 100 and an electrolytic solution are accommodated in the housing 50. The electrolytic solution is impregnated into the electrode group 100. The electrode group 100 is electrically connected to a positive electrode terminal 51 and a negative electrode terminal 52.

Figure 5:
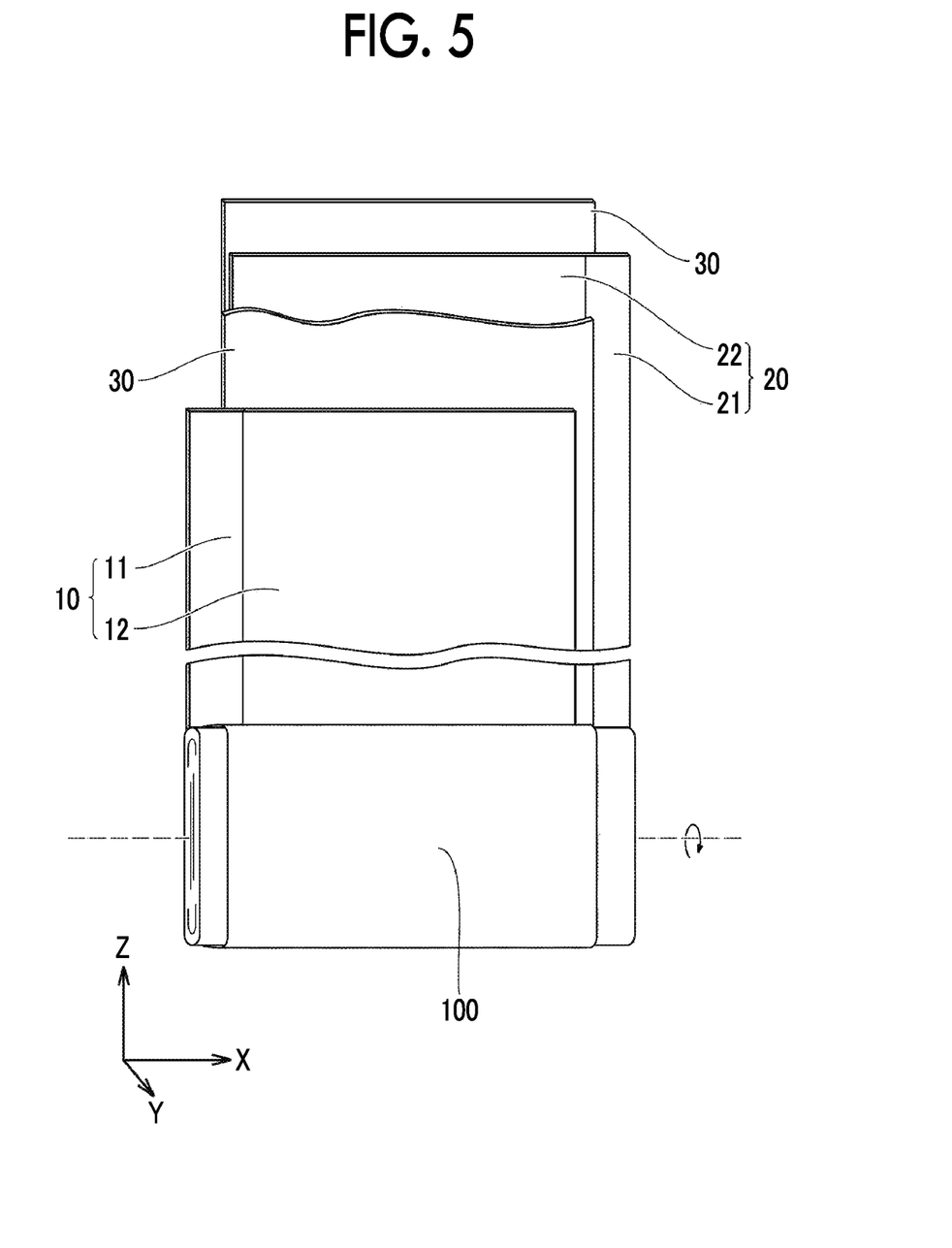
FIG. 5 is a schematic diagram showing an example of a configuration of an electrode group.

FIG. 5 is a schematic diagram showing an example of a configuration of an electrode group. The electrode group 100 includes a positive electrode 10, a separator 30, and a negative electrode 20. That is, the battery 101 includes at least the positive electrode 10, the negative electrode 20, and an electrolytic solution.

The electrode group 100 is a wound electrode group. That is, the electrode group 100 may be formed by laminating the positive electrode 10 and the negative electrode 20 with the separator 30 therebetween, and additionally winding them in a spiral shape. After the winding, the electrode group 100 may be formed into a flat shape. The electrode group may be a laminate electrode group. The laminate electrode group may be formed by alternately laminating a positive electrode and a negative electrode with a separator therebetween.

<Positive Electrode>

The positive electrode 10 is a belt-like sheet. The positive electrode 10 includes a current collector 11 and a positive electrode active material layer 12. The current collector 11 may be, for example, an Al foil. The current collector 11 may have, for example, a thickness of 10 μm to 30 μm.

The positive electrode active material layer 12 is disposed on a surface of the current collector 11. The positive electrode active material layer 12 may be disposed on both front and rear surfaces of the current collector 11. For example, the positive electrode active material layer 12 may be formed by applying a paste including the positive electrode active material to a surface of the current collector 11 and drying. The positive electrode active material layer 12 may have, for example, a thickness of 10 μm to 100 μm.

The positive electrode active material layer 12 includes the above positive electrode active material. One type of positive electrode active material may be used alone or two or more types of positive electrode active material may be used in combination. The positive electrode active material layer 12 may further include a conductive material and a binder. The positive electrode active material layer 12 may include, for example, the positive electrode active material at 75 mass % to 98 mass %, the conductive material at 1 mass % to 20 mass %, and the binder at 1 mass % to 5 mass %.

The conductive material is not particularly limited. The conductive material may be, for example, acetylene black, thermal black, vapor grown carbon fibers, or graphite. One type of conductive material may be used alone or two or more types of conductive material may be used in combination. The binder is not particularly limited. The binder may be, for example, polyvinylidene fluoride (PVdF), polytetrafluoroethylene (PTFE), or polyacrylic acid (PAA). One type of binder may be used alone and two or more types of binder may be used in combination.

<Negative Electrode>

The negative electrode 20 is a belt-like sheet. The negative electrode 20 includes a current collector 21 and a negative electrode active material layer 22. The current collector 21 may be, for example, a copper (Cu) foil. The current collector 21 may have, for example, a thickness of 5 μm to 30 μm.

The negative electrode active material layer 22 is disposed on a surface of the current collector 21. The negative electrode active material layer 22 may be disposed on both front and rear surfaces of the current collector 21. For example, the negative electrode active material layer 22 may be formed by applying a paste including the negative electrode active material to a surface of the current collector 21 and drying. The negative electrode active material layer 22 may have, for example, a thickness of 10 μm to 100 μm.

The negative electrode active material layer 22 includes a negative electrode active material. The negative electrode active material layer 22 may further include a binder. The negative electrode active material layer 22 may include, for example, the negative electrode active material at 95 mass % to 99 mass % and the binder at 1 mass % to 5 mass %. The negative electrode active material is not particularly limited. The negative electrode active material may be, for example, graphite, easily graphitizable carbon, non-graphitizable carbon, silicon, silicon oxide, tin, or tin oxide. One type of negative electrode active material may be used alone or two or more types of negative electrode active material may be used in combination. The binder is not particularly limited. The binder may be, for example, carboxymethyl cellulose (CMC), styrene butadiene rubber (SBR), or PAA. One type of binder may be used alone or two or more types of binder may be used in combination.

<Separator>

The separator 30 is a belt-like sheet. The separator 30 is an electrically insulating porous film. The separator 30 may have, for example, a thickness of 10 μm to 30 μm. The separator 30 may be made of, for example, polyethylene (PE) or polypropylene (PP). The separator 30 may have a multi-layer structure. For example, the separator 30 may be formed by laminating a PP porous film, a PE porous film, and a PP porous film in that order. The separator 30 may include a heat-resistant layer on its surface. The heat-resistant layer may include, for example, an inorganic filler such as alumina.

<Electrolytic Solution>

The electrolytic solution is a liquid electrolyte. The electrolytic solution includes a solvent and a Li salt. The electrolytic solution may include, for example, 0.5 to 2 mol/l of a Li salt. The Li salt may be, for example, $LiPF_6$, $LiBF_4$, or $Li[N(FSO_2)_2]$.

The solvent is aprotic. The solvent may be, for example, a mixed solvent of a cyclic carbonate and a chain carbonate. The mixing ratio may be, for example, "cyclic carbonate: chain carbonate=1:9 to 5:5" by volume ratio. The cyclic carbonate may be, for example, ethylene carbonate (EC), propylene carbonate (PC), or butylene carbonate (BC). The chain carbonate may be, for example, ethyl methyl carbonate (EMC), dimethyl carbonate (DMC), or diethyl carbonate (DEC). One type of each of the cyclic carbonate and the chain carbonate may be used alone and two or more types thereof may be used in combination.

The solvent may include, for example, a lactone, a cyclic ether, a chain ether, a carboxylic ester, and the like. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic ester include methyl formate (MF), methyl acetate (MA), and methyl propionate (MP).

The electrolytic solution may include various functional additives in addition to the solvent and the Li salt. The electrolytic solution may include, for example, 1 mass % to 5 mass % of functional additives. Examples of the functional additives include a gas generating agent (overcharge additive) and a film forming agent. Examples of the gas generating agent include cyclohexylbenzene (CHB) and biphenyl (BP). Examples of the film forming agent include vinylene carbonate (VC), vinyl ethylene carbonate (VEC), $Li[B(C_2O_4)_2]$, $LiPO_2F_2$, propanesultone (PS), and ethylene sulfite (ES).

<Applications>

The battery 101 may have low battery resistance. That is, the battery 101 may have a high output. The positive electrode 10 includes a positive electrode active material of the present embodiment. Examples of applications for which a high output is required include a power supply of a hybrid vehicle (HV), a plug-in hybrid vehicle (PHV), an electric vehicle (EV), and the like. However, the application of the battery 101 is not limited to such in-vehicle applications. The battery 101 can be applied to any application.

Examples will be described below. However, the following examples do not limit the scope of the claims.

Example 1

1-1. (α) Coprecipitation

A reaction tank was prepared. A 25 mass % NaOH aqueous solution and 25 mass % ammonia water were prepared. Water, the NaOH aqueous solution, and the ammonia water were put into the reaction tank, and they were stirred. Thereby, an aqueous alkali solution was prepared. A pH of the aqueous alkali solution was adjusted to 11 to 14.

A Co sulfate, a Mn sulfate, a Ni sulfate, and a La sulfate were dissolved in water. Each of the sulfates was mixed in in a predetermined proportion. Thereby, a raw material aqueous solution was prepared. The raw material aqueous solution was supplied to the reaction tank. A liquid mixture including the raw material aqueous solution and the aqueous alkali solution was stirred. The 25 mass % NaOH aqueous solution and the 25 mass % ammonia water were supplied to the reaction tank at a suitable time so that a pH of 11 to 14 was maintained. Thereby, a composite metal hydroxide precipitate was obtained. The precipitate was a powder.

The composite metal hydroxide was filtered off. The filtered composite metal hydroxide was washed with water. In addition, the composite metal hydroxide was dried. Accordingly, a precursor (composite metal hydroxide) was prepared. The precursor was secondary particles.

1-2. (β) Mixing

The composite metal hydroxide obtained above and $Li_2CO_3$ (lithium compound) were mixed using a ball mill. Thereby, a mixture was prepared.

1-3. (γ) Sintering

The mixture obtained above was heated at 900° C. for 15 hours. Thereby, a sintered product was prepared. The sintered product was cooled.

1-4. (δ) Disintegrating

The sintered product obtained above was disintegrated using a ball mill. Thereby, a positive electrode active material was produced. The positive electrode active material (secondary particles) had an average particle size of 10 μm. A cross section sample of the positive electrode active material (secondary particles) was prepared. The cross section sample was analyzed using an STEM-EDX device.

The primary particles were formed of $LiNi_{1/3}Co_{1/3}Mn_{1/3}O_2$ (lithium-containing composite metal oxide) having a layered rock salt structure. The presence of the electron conducting oxide on the surface of the secondary particles, in the open pores, and a grain boundary between the primary particles was confirmed. The electron conducting oxide had a perovskite structure. The electron conducting oxide had a composition of $LaNi_{0.2}Co_{0.4}Mn_{0.4}O_3$.

2-1. Production of Positive Electrode

The following materials were prepared.
Conductive material: acetylene black
Binder: PVdF
Solvent: NMP
Current collector: Al foil A positive electrode active material, a conductive material, binder, and a solvent were mixed using a planetary mixer. Thereby, a paste including the positive electrode active material was prepared. A solid content proportion of the paste was 50 mass %. A composition of the solid content was "positive electrode active material:conductive material:binder=84:12:4" by mass ratio. The paste was applied to surfaces (both front and rear surfaces) of a current collector using a die coater and dried. Thereby, a positive electrode active material layer was formed. The positive electrode active material layer was compressed using a rolling mill. The positive electrode active material layer and the current collector were cut into a belt form by a slitter. Thereby, a positive electrode was produced.

2-2. Production of Negative Electrode

The following materials were prepared.
Negative electrode active material: graphite
Binder: SBR, CMC
Solvent: water
Current collector: Cu foil A negative electrode active material, a binder, and a solvent were mixed using a planetary mixer. Thereby, a paste including the negative electrode active material was prepared. The paste was applied to surfaces (both front and rear surfaces) of a current collector using a die coater and dried. Thereby, a negative electrode active material layer was formed. The negative electrode active material layer was compressed using a rolling mill. The negative electrode active material layer and the current collector were cut into a belt form by a slitter. Thereby, a negative electrode was produced.

2-3. Assembly

A belt-like separator was prepared. The positive electrode and the negative electrode were laminated with the separator therebetween, and additionally, these were wound in a spiral shape. Thereby, an electrode group was formed. The electrode group was molded into a flat shape using a flat plate press machine. A rectangular housing was prepared. The electrode group was electrically connected to a positive electrode terminal and a negative electrode terminal. The electrode group was accommodated in the housing. A predetermined electrolytic solution was injected into the housing. The housing was hermetically sealed. Thereby, a lithium ion secondary battery was produced.

Comparative Example 1

A composite metal hydroxide ($LiNi_{1/3}Co_{1/3}Mn_{1/3}O_2$) was prepared in the same manner as in Example 1 except that no La sulfate was added. Then, in the same manner as in Example 1, a positive electrode active material was produced and a battery was produced. Comparative Example 1 is an example in which no electron conducting oxide was included in the positive electrode active material.

Comparative Example 2

A lanthanum alkoxide, a nickel alkoxide, a cobalt alkoxide, and a manganese alkoxide were prepared. The lanthanum alkoxide, nickel alkoxide, cobalt alkoxide, and manganese alkoxide were dissolved in a solvent. Thereby, a metal alkoxide solution was prepared.

The positive electrode active material produced in Comparative Example 1 was prepared. The positive electrode active material (secondary particles) was put into the metal alkoxide solution obtained above. The positive electrode active material was stirred using a stirring blade. The solvent was removed by drying. Thereby, a dried powder was collected. The dried powder was heated at 700° C. The positive electrode active material was analyzed using an STEM-EDX device. In Comparative Example 2, the presence of the electron conducting oxide ($LaNi_{0.2}Co_{0.4}Mn_{0.4}O_3$) on the surface of the secondary particle was confirmed. However, the presence of the electron conducting oxide in the open pores of the secondary particles and at a grain boundary between the primary particles was not confirmed. Then, in the same manner as in Example 1, a battery was produced.

Comparative Example 3

In the same manner as in Comparative Example 2, a positive electrode active material (secondary particles) was put into a metal alkoxide solution. The positive electrode active material was stirred using ultrasonic vibration. The solvent was removed by drying. Thereby, a dried powder was collected. The dried powder was heated at 700° C. The positive electrode active material was analyzed using an STEM-EDX device. In Comparative Example 3, the presence of the electron conducting oxide ($LaNi_{0.2}Co_{0.4}Mn_{0.4}O_3$) on the surface of the secondary particles and in the open pores was confirmed. This is thought to have been caused by the fact that the metal alkoxides diffused into the open pores due to ultrasonic vibration. However, the presence of the electron conducting oxide at a grain boundary between the primary particles was not confirmed. Then, in the same manner as in Example 1, a battery was produced.

Examples 2 to 12 and Comparative Examples 4 and 5

Positive electrode active materials were produced and batteries were produced in the same manner as in Example 1 except that mixing in of metal sulfates, heat treatment conditions, and the like were changed so that the electron conducting oxides in the following Table 1 were generated.

<Evaluation>

1. Activation of Battery and Measurement of Initial Capacity

At 25° C., according to the following constant current and constant voltage charging (CCCV charging), the batteries were fully charged. Next, according to the following constant current discharging (CC discharging), the batteries were discharged. A discharging capacity at this time was set as an initial capacity. Here, "1C" refers to a current at which the full charging capacity is discharged in 1 hour.

CCCV charging: CC current=⅓C, CV voltage=4.2 V, termination current=1/50 C

CC discharging: current=⅓C, termination voltage=3.0 V

2. Evaluation of Battery Resistance

A state of charge (SOC) of the battery was adjusted to 56%. The battery was discharged to a voltage between terminals of 3.0 V in a 25° C. environment. For discharging, CC discharging was performed. An amount of the voltage drop between the terminals 5 seconds after the discharging started was measured. A battery resistance was calculated by dividing the amount of the voltage drop between the terminals by the discharging current. The results are shown in the column of "battery resistance" in the following Table 1. The value shown here is a relative value when the battery resistance in Comparative Example 1 is set to "100." A smaller value indicates a lower battery resistance.

3. Evaluation of Amount of Gas Generated

In a 60° C. environment, charging and discharging were performed at a current of 2C over 1000 cycles. After 1000 cycles, the battery was immersed in an insulation oil. In the insulation oil, the housing of the battery was opened. Gas generated in the housing was collected in a measuring cylinder. Accordingly, a volume of the gas (amount of gas generated) was measured. The results are shown in the column of "amount of gas generated" in the following Table 1. The value shown here is a relative value when an amount of gas generated in Comparative Example 1 is set to "100."

TABLE 1

List of examples and comparative examples

| | Electron conducting oxide | | | | | Battery performance | |
|---|---|---|---|---|---|---|---|
| | Location | | | | | | |
| | Surface of secondary particles | Open pores between secondary particles | Grain boundary between primary particles | Crystal structure | Composition | Battery resistance | Amount of gas generated |
| Comparative Example 1 | N | N | N | — | — | 100 | 100 |
| Comparative Example 2 | P | N | N | Perovskite structure | $LaNi_{0.2}Co_{0.4}Mn_{0.4}O_{3-}$ | 90 | 85 |
| Comparative Example 3 | P | P | N | Perovskite structure | $LaNi_{0.2}Co_{0.4}Mn_{0.4}O_{3-}$ | 85 | 75 |
| Example 1 | P | P | P | Perovskite structure | $LaNi_{0.2}Co_{0.4}Mn_{0.4}O_{3-}$ | 70 | 75 |
| Example 2 | P | P | P | Perovskite structure | $LaCoO_3$ | 71 | 86 |
| Example 3 | P | P | P | Perovskite structure | $LaCo_{0.8}Mn_{0.2}O_3$ | 73 | 78 |
| Example 4 | P | P | P | Perovskite structure | $LaCo_{0.8}Mn_{0.2}O_3$ | 78 | 75 |
| Comparative Example 4 | P | P | P | Perovskite structure | $LaMnO_3$ | 91 | 73 |
| Example 5 | P | P | P | Perovskite structure | $LaCo_{0.5}Ni_{0.2}O_3$ | 72 | 81 |
| Example 6 | P | P | P | Perovskite structure | $LaCo_{0.5}Ni_{0.5}O_3$ | 75 | 75 |
| Example 7 | P | P | P | Perovskite structure | $LaCo_{0.2}Ni_{0.8}O_3$ | 77 | 76 |
| Comparative Example 5 | P | P | P | Perovskite structure | $LaNiO_3$ | 89 | 73 |
| Example 8 | P | P | P | Perovskite structure | $LaCo_{0.1}Ni_{0.4}Ni_{0.3}O_3$ | 73 | 74 |
| Example 9 | P | P | P | Perovskite structure | $SrCo_{0.5}Ni_{0.5}O_3$ | 69 | 78 |
| Example 10 | P | P | P | Perovskite structure | $La_{0.5}Sr_{0.5}Co_{0.5}Ni_{0.5}O_3$ | 71 | 74 |

TABLE 1-continued

List of examples and comparative examples

| | Electron conducting oxide | | | | | Battery performance | |
|---|---|---|---|---|---|---|---|
| | Location | | | | | | |
| | Surface of secondary particles | Open pores secondary particles | Grain boundary between primary particles | Crystal structure | Composition | Battery resistance | Amount of gas generated |
| Example 11 | P | P | P | Perovskite structure | $La_{0.7}Co_{0.1}Mn_{0.4}Ni_{0.4}O_{2.55}$ | 71 | 71 |
| Example 12 | P | P | P | Perovskite structure | $LaCo_{0.05}Mn_{0.95}O_3$ | 81 | 75 |

In Table 1, in Comparative Examples 2 and 3 and Examples 1 to 12, proportions of the electron conducting oxide with respect to the amount of the lithium-containing composite metal oxide were assumed to be the same.

In Table 1, "P (positive)" shown in the column of "location" indicates that the presence of the electron conducting oxide at the location was confirmed using an STEM-EDX device. "N (negative)" indicates that the presence of the electron conducting oxide at the location was not confirmed.

<Results>

As shown in Table 1, Examples 1 to 12 had lower battery resistances than Comparative Examples 1 to 3. This is thought to have been caused by the fact that the electron conducting oxide was disposed at a dense grain boundary between the primary particles in Examples 1 to 12.

Examples 1 to 12 had lower battery resistances than Comparative Examples 4 and 5. This is thought to have been caused by the fact that formation of an inactive phase was prevented due to the inclusion of Co in the B sites of the perovskite structure.

Examples 1, 3 to 12 had a smaller amount of gas generated than Example 2. This is thought to have been caused by the fact that the crystal structure was stabilized due to the inclusion of at least one of Mn and Ni at a specific proportion in the B sites of the perovskite structure in addition to Co.

The above embodiments and examples are only examples and should not be considered as restrictive. The technical scope defined by the appended claims includes equivalents of the scope of the claims and all modifications falling within the scope of the claims.

What is claimed is:

1. A positive electrode active material comprising: secondary particles, wherein the secondary particles include a plurality of primary particles, the primary particles are a lithium-containing composite metal oxide, inside the secondary particles, an electron conducting oxide is disposed at substantially an entire grain boundary between the primary particles inside the secondary particle, and the electron conducting oxide has a perovskite structure and is represented by Formula (I): $ACo_{x1}M_{x2}O_3$, wherein in the formula, A is at least one of La and Sr, M is at least one of Mn and Ni, and x1 and x2 satisfy $0<x1\leq1$, $0\leq x2\leq1$, and $0.6\leq x1+x2\leq1$.

2. The positive electrode active material according to claim 1, wherein, in Formula (I), x2 satisfies $0.2\leq x2\leq0.95$.

3. The positive electrode active material according to claim 1, wherein, in Formula (I), A is La.

4. The positive electrode active material according to claim 1, wherein, in Formula (I), A is Sr.

5. The positive electrode active material according to claim 1, wherein, in Formula (I), A is both La and Sr.

6. The positive electrode active material according to claim 1, wherein, in Formula (I), M is Mn.

7. The positive electrode active material according to claim 1, wherein, in Formula (I), M is Ni.

8. The positive electrode active material according to claim 1, wherein, in Formula (I), M is both Mn and Ni.

9. A lithium ion secondary battery comprising:
a positive electrode, wherein the positive electrode includes the positive electrode active material according to claim 1;
a negative electrode; and
an electrolytic solution.

10. A method of producing the positive electrode active material according to claim 1, the method comprising:
preparing a precursor using a coprecipitation method;
preparing a mixture by mixing the precursor and a lithium compound;
preparing a sintered product by heating the mixture; and
disintegrating the sintered product to produce the positive electrode active material, wherein the precursor includes the secondary particles, the secondary particles include a plurality of the primary particles inside the secondary particles, and the primary particles are a composite metal hydroxide, and
wherein, when the mixture is heated, the primary particles become the lithium-containing composite metal oxide, and the electron conducting oxide is precipitated at substantially an entire grain boundary between the primary particles.

* * * * *

UNITED STATES PATENT AND TRADEMARK OFFICE
CERTIFICATE OF CORRECTION

PATENT NO. : 10,971,720 B2
APPLICATION NO. : 15/953947
DATED : April 6, 2021
INVENTOR(S) : Ryuta Sugiura et al.

It is certified that error appears in the above-identified patent and that said Letters Patent is hereby corrected as shown below:

In the Specification

In Column 11, Line(s) 2, after "mixed", delete "in".

In Column 14, table 1, after "Open pores", insert --of--.

In Column 14, table 1, Example 4, delete "LaCo$_{0.8}$Mn$_{0.2}$O$_3$" and insert --LaCo$_{0.2}$Mn$_{0.8}$O$_3$--, therefor.

In Column 15, table 1, after "Open pores", insert --of--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*